US010391398B2

(12) United States Patent
Yamanokuchi et al.

(10) Patent No.: US 10,391,398 B2
(45) Date of Patent: Aug. 27, 2019

(54) GAME DEVICE HAVING IMPROVED SLIDE-OPERATION-DRIVEN USER INTERFACE

(71) Applicant: GREE, Inc., Tokyo (JP)

(72) Inventors: Junko Yamanokuchi, Tokyo (JP); Masato Nozaki, Tokyo (JP)

(73) Assignee: GREE, Inc., Tokyo (JP)

( * ) Notice: Subject to any disclaimer, the term of this patent is extended or adjusted under 35 U.S.C. 154(b) by 32 days.

(21) Appl. No.: 15/714,103

(22) Filed: Sep. 25, 2017

(65) Prior Publication Data

US 2018/0093180 A1    Apr. 5, 2018

(30) Foreign Application Priority Data

Sep. 30, 2016 (JP) ................................ 2016-194221

(51) Int. Cl.
*A63F 9/24* (2006.01)
*A63F 13/40* (2014.01)
(Continued)

(52) U.S. Cl.
CPC .......... *A63F 13/40* (2014.09); *A63F 13/2145* (2014.09); *A63F 13/25* (2014.09);
(Continued)

(58) Field of Classification Search
CPC .... G06F 3/04883; G06F 3/0482; A63F 13/25; A63F 13/40; A63F 13/2145; A63F 13/52
See application file for complete search history.

(56) References Cited

U.S. PATENT DOCUMENTS

2009/0143141 A1* 6/2009 Wells ................ G07F 17/32
463/37
2009/0289900 A1* 11/2009 Lavski ................ A63F 13/06
345/173
(Continued)

FOREIGN PATENT DOCUMENTS

JP    2010233833 A    10/2010
JP    2011090532 A     5/2011
(Continued)

OTHER PUBLICATIONS

Office Action dated Nov. 8, 2016 of corresponding Japanese application No. 2016-194221; 5 pgs.

(Continued)

*Primary Examiner* — Steve Rowland
(74) *Attorney, Agent, or Firm* — Maier & Maier, PLLC

(57) ABSTRACT

Provided are a program, a control method, and an information processing apparatus which may provide an improved user interface on which a user may easily and efficiently execute various processes on a game content. The information processing apparatus may be caused to execute a game content specifying step of specifying a selected game content on the basis of first input operation data from an operation unit, a step of retrieving information from a storage unit, a step of specifying a direction from a start point to an end point of a second input operation on the basis of second input operation data from an operation unit, and an execution step of executing one process associated with the direction from the start point to the end point of the second input operation in the information from the storage unit on the selected game content.

11 Claims, 11 Drawing Sheets

(51) Int. Cl.
    *A63F 13/2145*     (2014.01)
    *A63F 13/25*     (2014.01)
    *A63F 13/52*     (2014.01)
    *G06F 3/0484*     (2013.01)
    *G06F 3/0486*     (2013.01)
    *G06F 3/0488*     (2013.01)
    *G06F 3/0489*     (2013.01)
    *G06F 3/0482*     (2013.01)

(52) U.S. Cl.
    CPC ............ *A63F 13/52* (2014.09); *G06F 3/0486* (2013.01); *G06F 3/04842* (2013.01); *G06F 3/04883* (2013.01); *G06F 3/04895* (2013.01); *G06F 3/0482* (2013.01)

(56) References Cited

U.S. PATENT DOCUMENTS

| | | | | |
|---|---|---|---|---|
| 2010/0321319 | A1* | 12/2010 | Hefti | G06F 3/04883 345/173 |
| 2011/0107268 | A1* | 5/2011 | Scherk | G06F 3/0482 715/845 |
| 2012/0021833 | A1* | 1/2012 | Boch | G06F 3/011 463/36 |
| 2013/0185636 | A1* | 7/2013 | Lim | G06F 3/03547 715/716 |
| 2014/0098050 | A1* | 4/2014 | Endo | G06F 3/0487 345/173 |
| 2015/0135108 | A1* | 5/2015 | Pope | G06K 9/00006 715/767 |
| 2017/0092038 | A1* | 3/2017 | Vann | G07F 17/323 |

FOREIGN PATENT DOCUMENTS

| | | |
|---|---|---|
| JP | 2012185838 A | 9/2012 |
| JP | 2015229081 A | 12/2015 |
| JP | 2016158668 A | 9/2016 |

OTHER PUBLICATIONS

Office Action dated Feb. 7, 2017 of corresponding Japanese application No. 2017-005017; 6 pgs.
Office Action dated May 23, 2017 of corresponding Japanese application No. 2017-005017; 3 pgs.

* cited by examiner

FIG.4

| TYPE OF GAME MEDIUM | DIRECTION | | | | |
| --- | --- | --- | --- | --- | --- |
| | UPWARD | DOWNWARD | RIGHTWARD | LEFTWARD | LOWER RIGHTWARD |
| CHARACTER | REINFORCEMENT SYNTHESIS | – | EVOLUTION SYNTHESIS | TRADE | – |
| PARAPHERNALIA | SYNTHESIS | WAREHOUSE | SPECIAL SYNTHESIS | TRADE | – |
| ITEM | REINFORCEMENT (CONSUMPTION OF POINTS) | WAREHOUSE | – | TRADE | – |
| ... | ... | ... | ... | ... | ... |

GAME DEVICE HAVING IMPROVED SLIDE-OPERATION-DRIVEN USER INTERFACE

BACKGROUND OF THE INVENTION

Field of the Invention

The present invention relates to a program, a control method, and an information processing apparatus.

Description of the Related Art

A user playing a role-playing game or the like may acquire a game content such as a card, an item, equipment, a character, or the like with the playing of the game. The user can execute various processes (for example, synthesis, reinforcement, trade, and the like) by using the game content in the game.

In a case where the user executes one process (for example, synthesis), the following procedure is often followed. First, the user selects one process from a menu screen and displays a dedicated screen for executing the process. On the dedicated screen, the user selects a game content (for example, a synthesis-source character and a material character) to be processed. Then, the user pushes an execute button.

In the above procedure, selection and execution of one process are performed in separate steps. When the selection and execution of one process is performed in one step, the process for the game content is more efficiently executed.

For example, JP-A-2012-185838 discloses a drag-and-drop widely used in a personal computer (PC). By the drag-and-drop, a selected object (for example, a document file or the like) is moved to an icon of one application, so that the process associated with the application can be executed.

In recent years, in many cases, games are played on mobile terminals such as smartphones. A display unit of the mobile terminal is smaller in size than a display unit of the PC. For this reason, when various processes are executed on a game content in a game played on a mobile terminal, it is not practical to directly apply drag-and-drop. For this reason, a new user interface capable of efficiently executing various processes on the game content has been demanded.

SUMMARY OF THE INVENTION

The invention is to provide a program, a control method, and an information processing apparatus that realize a user interface capable of easily and efficiently executing various processes on a game content.

According to an exemplary embodiment, there may be provided a program causing an information processing apparatus including a display unit which displays a game content, an operation unit which receives a first input operation of a user selecting a game content and a second input operation of instructing a process on the game content selected by the first input operation and outputs first input operation data where the first input operation may be associated with coordinate information and second input operation data where the second input operation may be associated with the coordinate information, and a storage unit which may store information where a process on the game content and a direction are associated with each other to execute: a game content specifying step of specifying the selected game content on the basis of the first input operation data; a step of retrieving the information from the storage unit; a step of specifying a direction from a start point to an end point of the second input operation on the basis of the second input operation data; and an execution step of executing one process associated with the direction from the start point to the end point of the second input operation in the information on the selected game content.

According to another exemplary embodiment, there may be provided a control method for a game executed by an information processing apparatus including a display unit which displays a game content, an operation unit which receives a first input operation of a user selecting a game content and a second input operation of instructing a process on the game content selected by the first input operation and outputs first input operation data where the first input operation is associated with coordinate information and second input operation data where the second input operation is associated with the coordinate information, and a storage unit which may store information where a process on the game content and a direction are associated with each other, the control method including: specifying the selected game content on the basis of the first input operation data; retrieving the information from the storage unit; specifying a direction from a start point to an end point of the second input operation on the basis of the second input operation data; and executing one process associated with the direction from the start point to the end point of the second input operation in the information on the selected game content.

According to still another exemplary embodiment, there may be provided an information processing apparatus, including: a display unit which displays a game content; an operation unit which receives a first input operation of a user selecting a game content and a second input operation of instructing a process on the game content selected by the first input operation and outputs first input operation data where the first input operation may be associated with coordinate information and second input operation data where the second input operation may be associated with the coordinate information; a storage unit which may store information where a process on the game content and a direction are associated with each other; and a control unit, in which the control unit specifies the selected game content on the basis of the first input operation data, retrieves the information from the storage unit, specifies a direction from a start point to an end point of the second input operation on the basis of the second input operation data, and executes one process associated with the direction from the start point to the end point of the second input operation in the information on the selected game content.

According to an exemplary embodiment, it may be possible to provide a program, a control method, and an information processing apparatus realizing a user interface capable of easily and efficiently executing various processes on a game content.

BRIEF DESCRIPTION OF THE DRAWINGS

FIG. 4 is a diagram illustrating an example of information (table) stored in a storage unit;

DETAILED DESCRIPTION OF THE INVENTION

Hereinafter, embodiments of the invention will be described.

(Configuration of Information Processing Apparatus)

Figure 1:
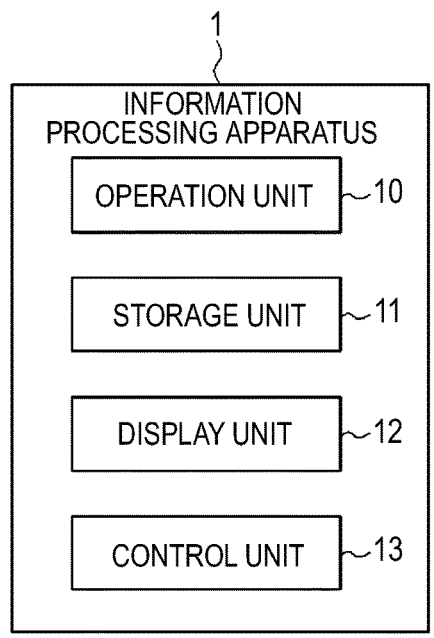
FIG. 1 is a block diagram of an information processing apparatus according to an exemplary embodiment.

An information processing apparatus 1 according to an exemplary embodiment will be described with reference to FIG. 1. The information processing apparatus 1 may be, for example, a smartphone, a tablet, a game machine, or the like, and may execute a game application (program). The game application may be received from, for example, a predetermined application distribution server via the Internet. Alternatively, the game application may be stored in advance in a storage device provided in the information processing apparatus 1 or a storage medium such as a memory card that may be readable by the information processing apparatus 1.

Herein, an overview of a game application executed by the information processing apparatus 1 according to the embodiment (hereinafter, referred to as a game according to the embodiment) will be described. The game according to the embodiment may be, for example, a role-playing game or the like. A user may operate a user character in a virtual space to play the game. The user acquires a game content with the playing of the game. In addition, the user can execute various processes on the acquired game content.

The game content may be electronic data used for a game and may include any medium such as a card, an item, equipment, a character, and an object. In addition, the user can execute, for example, acquisition, holding, use, management, exchange, synthesis, reinforcement, trade, destruction, donation, or the like as a process on the game content in the game. Herein, the usage mode of the game content may not be limited to those disclosed in this specification.

The game according to the embodiment may include the following contents as a schematic example. The user may operate the user character to play the game while searching for the field in the game. In the field, for example, a town, a battle stage, and the like may be provided. For example, the user character can have a conversation with a resident character in a town, fight a battle against an enemy character encountered in a battle stage, and the like. In the field in the game, various events corresponding to the area may occur. As the events are executed, the main story of the game may progress. For example, in a case where a user character wins the battle with an enemy character, the user can acquire the game content.

Configuration components of the information processing apparatus 1 will be described. The information processing apparatus 1 may be configured to include an operation unit 10, a storage unit 11, a display unit 12, and a control unit 13.

The operation unit 10 may receive a user's input operation and outputs input operation data where the input operation may be associated with coordinate information. As described above, in the game executed by the information processing apparatus 1, various processes can be executed on the game content. The user's input operation received by the operation unit 10 may include, for example, an operation of the user selecting a game content to be processed. In addition, the user's input operation received by the operation unit 10 may include, for example, an operation of instructing execution of a desired process on the game content selected by the user.

In the information processing apparatus 1 according to the embodiment, the operation unit 10 may be a touch panel integrated with the display unit 12. For example, the information processing apparatus 1 has a configuration in which a transparent sensor layer detecting a change in electrostatic capacitance which may be the operation unit 10 may be overlapped on a liquid crystal display (LCD) layer which may be the display unit 12 (a configuration in which the LCD layer may be viewed through the sensor layer by a user). The operation unit 10 can detect the position touched by the user by detecting the change in electrostatic capacitance. A touch panel of a type other than the electrostatic capacitance type may be employed as the operation unit 10.

The user performs an input operation by touching the operation unit 10 by using a finger or an instrument such as a stylus. In the embodiment, the user can select a game content and deselect (release) the selected game content by tapping. The tap may be an operation in which the user touches the operation unit 10 with his or her finger and then releases the finger without moving the finger. In the embodiment, the user can select and release consecutive game content and can execute a desired process on the game content by tapping and/or slide operation. The slide operation may be an operation of moving a finger with which the user touches the operation unit 10 on the operation unit 10. The slide operation may include, for example, flick, swipe, and the like. The flick may be an operation in which the user touches the operation unit 10 with the finger or the like and releases the finger while quickly moving the finger in the state where the finger may be in touch with the operation unit. The swipe may be an operation in which the user touches the operation unit 10 with the finger or the like and moves the finger in the state where the finger may be in touch with the operation unit. Herein, the point at which the user touches the operation unit 10 with the finger or the like and starts an input operation may be referred to as a start point. In addition, the point at which the user releases the finger or the like that has been touching the operation unit 10 at the time of ending the input operation may be referred to as an end point. In addition, a point on the route between where the user touches the operation unit 10 at the start of the input operation to where the user ceases touching the operation unit 10 at the end of the input operation may be referred to as an intermediate point. Herein, it may be preferable that the point at which the finger or the like may be temporarily separated during the input operation may not be treated as an end point, and in a case where the finger or the like may be in touch with the operation unit 10 again within a predetermined time (for example, 0.5 seconds), the point may not be treated as an end point.

The operation unit 10 associates the tap position, the start and end points of the slide operation, the route of the slide operation, and the like with the coordinate information on the touch panel. The start point, the end point, the route, and the like associated with the coordinate information may be output as the input operation data. In the information processing apparatus 1 according to the embodiment, coordinates in a rectangular coordinate system in which the horizontal and vertical directions of the screen of the display unit 12 integrated with the operation unit 10 may be the X and Y axes, respectively, may be used. In addition, the input operation data also may include information on the elapsed time from the start of the input operation.

The storage unit 11 may be, for example, a storage device and may store various types of information and programs (game applications) necessary for processing the game. The storage unit 11 may include, for example, a semiconductor memory, a magnetic memory, an optical memory, or the like. The storage unit 11 may store an image of a game content displayed in a virtual space (virtual game space). In addition, the storage unit 11 may store various parameters (for example, attribute, level, attack power, defense power, rareness value, and the like) of the game content. In addition, the storage unit 11 may store a table 111 (refer to FIG. 4) described later. In addition, the storage unit 11 may store various images (texture images) for projection onto various objects arranged in a virtual space (texture mapping). In addition, the storage unit 11 may store images of backgrounds (background images) such as sky and distant landscape and images of fields (field images) such as towns and battle stages. The storage unit 11 may be a memory (for example, a RAM or the like) for storing the data received from the server as a cache.

The display unit 12 displays the virtual space in which the user character may be arranged. In the embodiment, the display unit 12 may be a liquid crystal display (LCD) layer of a touch panel, but the display unit may not be limited thereto. For example, the display unit 12 may be a display device such as an organic EL display.

The control unit 13 may be a dedicated microprocessor or a CPU which realizes a specific function by reading a specific program. The control unit 13 controls the operation of the information processing apparatus 1. For example, the control unit 13 may execute a game application in accordance with a user's operation on the operation unit 10. In addition, the control unit 13 may execute various processes related to the game.

The control unit 13 allows the display unit 12 to display a virtual space including, for example, a field and a user character. In addition, the control unit 13 allows the display unit 12 to display a game content such as a card or equipment. In addition, the control unit 13 identifies the game content selected by the user's input operation. The control unit 13 may execute a process according to the user's input operation on the selected game content. Hereinafter, an example of a screen displayed on the display unit 12 of the information processing apparatus 1 according to the embodiment and a process on the game content will be described with reference to FIGS. 2 to 8.

(Selection of Game Content)

Figure 2:
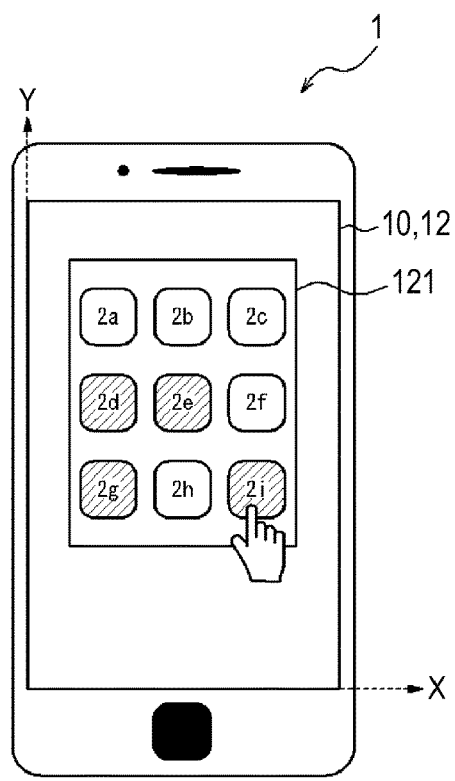
FIG. 2 is a diagram illustrating a display area for displaying a game content.

As illustrated in FIG. 2, the information processing apparatus 1 may be configured to include an operation unit 10 and a display unit 12 which may be integrated to constitute a touch panel. The display unit 12 may be provided with a display area 121 for displaying game content 2*a* to 2*i*. Each of the game content 2*a* to 2*i* may be an individual game content. In the display area 121, a list of the game content 2*a* to 2*i* may be displayed. To display a list may be to arrange and display the game content in an easy-to-understand manner for the user so that the user can easily select the game content. In the example of FIG. 2, a list in which the game content 2*a* to 2*i* may be arranged in three rows and three columns in the vertical and horizontal directions may be displayed. In the embodiment, regardless of the process to be executed, the display area 121 may be used for selecting the game content 2*a* to 2*i*. Since the selection screen may be unified regardless of the process, the result may be more convenient for the user.

The user can select the game content by tapping the game content 2*a* to 2*i* displayed on the display area 121. By tapping the already-selected game content 2*a* to 2*i*, it may be possible to deselect (cancel the selection). In addition, even in a case where the user touches the game content 2*a* to 2*i* by the slide operation, the touched game content 2*a* to 2*i* can be selected. In the example of FIG. 2, the user has selected the game content 2*d*, 2*e*, 2*g*, and 2*i*. Since the display color of the selected game content 2*d*, 2*e*, 2*g*, and 2*i* changes, the user can confirm the selection result. As another example, the selected game content 2*d*, 2*e*, 2*g*, and 2*i* may be blinking, the shape may be changed, the display mode may be changed, or an image indicating the selection may be added.

Herein, the operation unit 10 may receive the user's input operation and outputs the input operation data where the input operation may be associated with the coordinate information. As illustrated in FIG. 2, the operation unit 10 uses coordinates in a rectangular coordinate system in which the horizontal direction of the screen may be set to the X axis and the vertical direction may be set to the Y axis. The coordinate information may be used as follows. For example, the operation unit 10 may receive the user's input operation of tapping the game content 2*i* and outputs the input operation data in association with the coordinates of the tap position. After that, the input operation data may be retrieved by the control unit 13, and the coordinates of the tap position may be grasped. Then, control for changing the display color of the game content 2*i* displayed at the coordinates of the tap position may be executed by the control unit 13.

The information processing apparatus 1 according to the embodiment can execute various processes on the selected game content 2*d*, 2*e*, 2*g*, and 2*i*. As described above, the information processing apparatus 1 may be, for example, a smartphone, a tablet, a game machine, or the like. For this reason, it may not be practical to directly apply drag-and-drop to the information processing apparatus 1.

Figure 12:
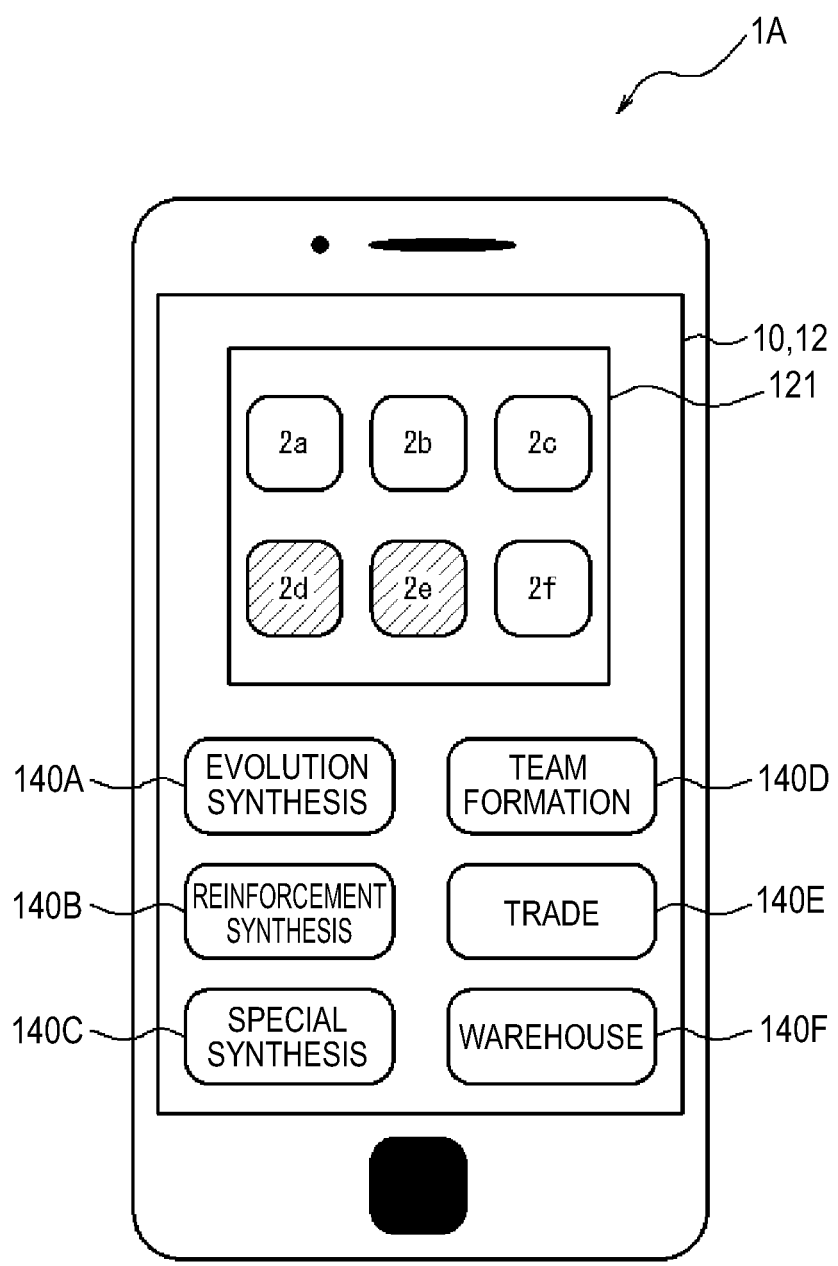
FIG. 12 is a diagram illustrating an example of a screen in a case where drag-and-drop may be applied to a smartphone.

FIG. 12 illustrates an example of a screen in a case where drag-and-drop may be directly applied to an information processing apparatus 1A which may be a smartphone. In the display unit 12 of the information processing apparatus 1A, process regions corresponding to application icons may be provided. In the example of FIG. 12, as the process regions, there may be provided a region 140A for evolution synthesis, a region 140B for reinforcement synthesis, a region 140C for special synthesis, a region 140D for team formation, a region 140E for trade, and a region 140F for warehouse. In the example of FIG. 12, the user can collectively process the selected game content by dragging the selected game content 2d and 2e to one of the process regions.

However, the process regions may be provided in the display unit 12 of which size may be smaller than that of the PC, so that the display area 121 for displaying the game content 2a to 2f becomes small. The number of game content that can be selected at one time may be decreased, and as a result, the number of times of execution of the process may be increased, which may be inconvenient for the user.

The information processing apparatus 1 according to the embodiment can execute various processes on the selected game content 2d, 2e, 2g, and 2i without providing the process regions on the display unit 12. Specifically, the information processing apparatus 1 may execute various processes by allowing the processes to correspond to the directions of the user's slide operation. In other words, the user can execute a desired process only by slide operation in a predetermined direction.

(Display of Help Information)

Herein, there may be a possibility that the user may be confused as to which direction of the slide operation a desired process corresponds to. When the user long-pushes (long-taps) the game content after selecting the game content 2a to 2i, the information processing apparatus 1 according to the embodiment displays help information 122 on the display unit 12.

Figure 3A:
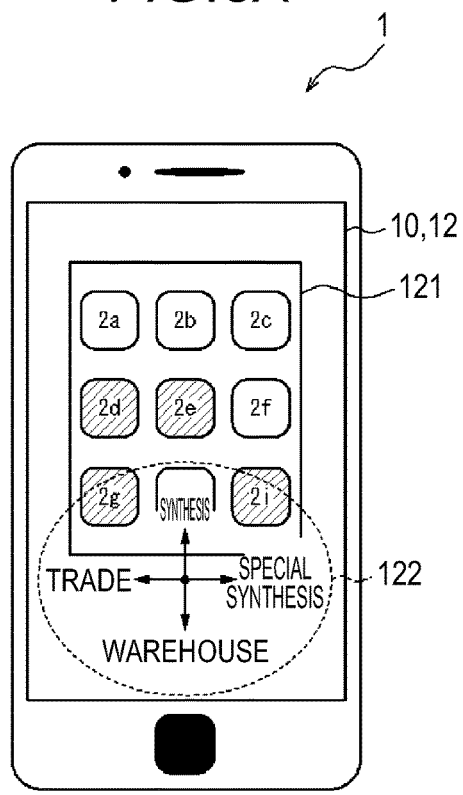
FIG. 3A is a diagram illustrating an example of help information.

FIG. 3A may be a diagram illustrating an example of the help information 122. In the embodiment, the help information 122 may be information such as an image explaining the correspondence between the processes on the game content and the directions. Herein, the help information 122 may include text-based explanation, such as a sentence. In addition, the help information 122 may be only the text-based explanation. Namely, the help information 122 may be at least one of an image and a sentence explaining the correspondence between the processes on the game content and the directions.

In the example of FIG. 3A, the game content 2a to 2i displayed on the display area 121 may be equipment (for example, weapon, helmet, armor, shield, and the like) to be worn by the character. For the equipment, the processes of synthesis, warehouse, special synthesis, and trade may be possible. The synthesis may be a process of combining material equipment with synthesis-source equipment to configure the synthesis-source equipment as another equipment. The warehouse may be a process of moving equipment not to be used to a virtual warehouse in the game space to store the equipment. The special synthesis may be synthesis that may be performed by consuming not only in-game currency but also special items. The special synthesis can further reinforce the parameters of the synthesis-source equipment as compared to simple synthesis. The trade may be a process of exchanging equipment with in-game currency. In the example of FIG. 3A, the help information 122 indicates that the upward slide operation may be synthesis. In addition, the help information 122 indicates that the downward slide operation may be warehouse. In addition, the help information 122 indicates that the rightward slide operation may be special synthesis. In addition, the help information 122 indicates that the leftward slide operation may be trade.

Figure 3B:
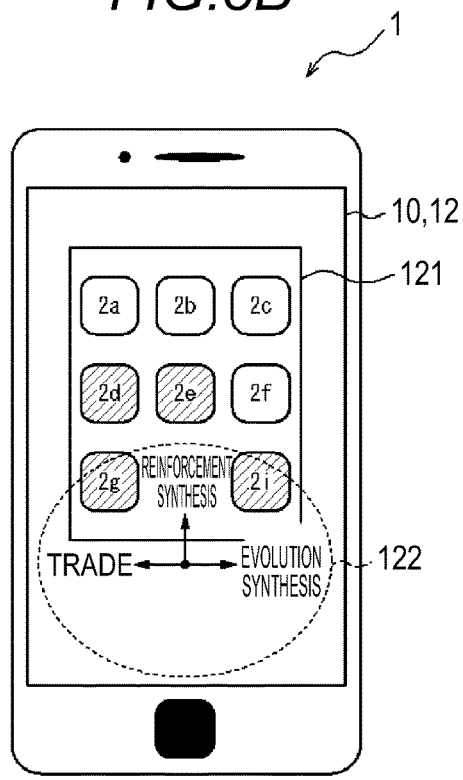
FIG. 3B is a diagram illustrating an example of help information.

FIG. 3B may be a diagram illustrating another example of the help information 122. In the example of FIG. 3B, the game content 2a to 2i displayed on the display area 121 may be characters. For the characters, processes of reinforcement synthesis, evolution synthesis and trade may be possible. Reinforcement synthesis may be a process of reinforcing parameters of a synthesis-source character by combining a material character with the synthesis-source character. Evolution synthesis may be a process of converting a synthesis-source character into another character by combining a material character with the synthesis-source character. Trade may be a process of exchanging characters with in-game currency. In the example of FIG. 3B, the help information 122 indicates that the upward slide operation may be reinforcement synthesis. In addition, the help information 122 indicates that the rightward slide operation may be evolution synthesis. In addition, the help information 122 indicates that the leftward slide operation may be trade. In the example of FIG. 3B, there may be no process corresponding to the downward slide operation.

In the embodiment, as illustrated in FIGS. 3A and 3B, the process varies depending on the type (equipment, character) of the game content 2a to 2i displayed on the display area 121. Namely, the information processing apparatus 1 associates an appropriate process according to the type of the game content with the direction of the slide operation. Such association may be executed on the basis of the information stored in the storage unit 11 as the table 111.

FIG. 4 may be a diagram illustrating an example of the table 111 stored in the storage unit 11. As described above, the table 111 associates the process on the game content with the direction of the slide operation. In the embodiment, the table 111 associates various processes on the game content with the directions of the slide operations for each type of game content. The directions of the slide operations are, for example, upward, downward, leftward, rightward, upper rightward, and the like. However, not all directions need to be associated with processes. In the example of FIG. 4, even though the type of the game content may be a character, equipment, or an item, the process may not be associated with the upper rightward direction.

The correspondence between the processes in a case where the type of the game content may be a character and equipment in FIG. 4 and the directions of the slide operations may be the same as the help information 122 described in FIGS. 3A and 3B, respectively. In addition, in the example of FIG. 4, in a case where the type of the game content may be an item, the upward slide operation may be associated with reinforcement executed by consuming points. In addition, the downward slide operation may be associated with the warehouse. In addition, the leftward slide operation may be associated with the trade.

Herein, as another example, in the table 111, the correspondence between the processes and the directions of the slide operations may be shared without dividing for each type of game content. However, in a case where there may be many processes on the game content (for example, more than eight types), it may be preferable that the processes corresponding to the types of game content 2a to 2i displayed on the display area 121 as in the embodiment may be associated with the directions of the slide operations. In addition, as still another example, the processes may be different depending on the types of the selected game content 2d, 2e, 2g, and 2i instead of the types of the game content 2a to 2i displayed on the display area 121.

In addition, as in the example of FIG. 4, it may be preferable that the same process may be associated with the same direction regardless of the type of the game content 2a to 2i. For example, even though the game content 2a to 2i may be characters, equipment, or items, it may be possible to trade the characters, equipment, or items. Then, the trade may be associated with the leftward direction. In addition, even though the game content 2*a* to 2*i* may be equipment or items, it may be possible to store the equipment or items in a warehouse (or to take the equipment or items out from the warehouse). Then, the warehouse may be associated with the downward direction. As in this example, it may be preferable that processes common to two or more types of game content 2*a* to 2*i* may be associated with the same direction of the slide operation. At this time, since the user may store the specific process and the specific direction in association with each other, it may be possible to reduce the trouble of confirming the help information 122.

(Execution of Process)

As described above, the user has selected the game content 2*d*, 2*e*, 2*g*, and 2*i* from the game content 2*a* to 2*i* displayed on the display area 121 by tapping (refer to FIG. 2). Then, the user long-pushes the operation unit 10 integrated with the display unit 12 to display the help information 122 and confirms the correspondence between the processes and the directions (refer to FIGS. 3A and 3B). Then, by performing a slide operation (flicking as a specific example) in a direction corresponding to a desired process, it may be possible to collectively execute the desired process on the selected game content 2*d*, 2*e*, 2*g*, and 2*i*.

Figure 5A:
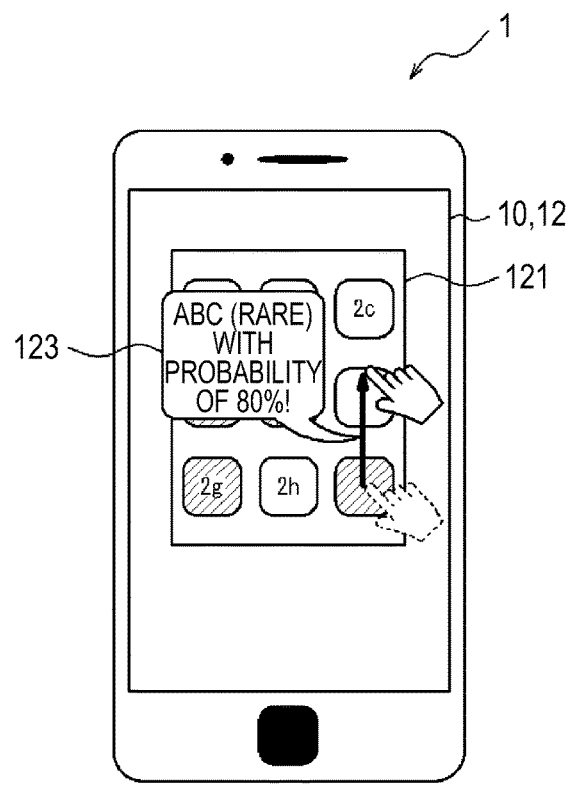
FIG. 5A a is a diagram illustrating a manner where a user executes one process by a slide operation.
Figure 5B:
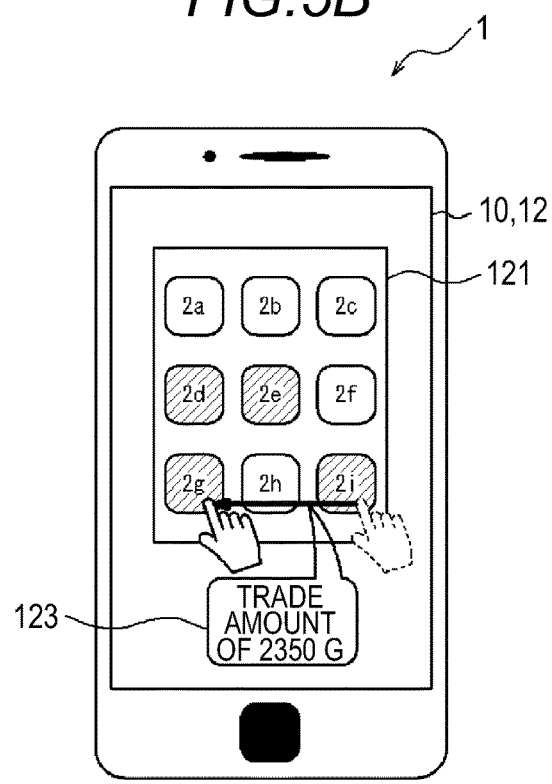
FIG. 5B a is a diagram illustrating a manner where a user executes one process by a slide operation.

FIGS. 5A and 5B illustrate the states where the user may execute one process by a slide operation. In the examples of FIGS. 5A and 5B, the game content 2*a* to 2*i* displayed on the display area 121 may be equipment. In the example of FIG. 5A, the user may execute synthesis on the selected game content 2*d*, 2*e*, 2*g*, and 2*i*. The synthesis may be associated with an upward slide operation. When the user performs an upward slide operation with the finger or the like, a prediction 123 may be popped up in the middle of the process (before execution of synthesis). The prediction 123 may be a result expected in a case where one process corresponding to the direction of the slide operation to a middle point determined by the table 111 may be executed on the selected game content. The prediction 123 may not be limited to deterministic contents. For example, in a case where one process may be executed according to a predetermined probability, the prediction 123 may include one or plural results with probabilities (for example, X with a probability of 70%, Y with a probability of 20%, Z with a probability of 10%, or the like). In the example of FIG. 5A, the prediction 123 indicates the prediction result of the synthesis. The prediction 123 informs the user that the synthesis result may be "ABC (rare)" with a probability of 80%. Furthermore, when the user performs an upward slide operation with the finger or the like, synthesis may be executed on the selected game content 2*d*, 2*e*, 2*g*, and 2*i*. Herein, in the synthesis, the first selected game content 2*d* may be treated as a synthesis source, or the last selected game content 2*i* may be treated as a synthesis source.

In the example of FIG. 5B, the user collectively sells the selected game content 2*d*, 2*e*, 2*g*, and 2*i*. The trade may be associated with the leftward slide operation. When the user performs a leftward slide operation with the finger or the like, the prediction 123 may be popped up in the middle of the process (before the trade may be executed). In the example of FIG. 5B, the prediction 123 indicates the prediction result of the trade (predicted trade amount). The prediction 123 informs the user that the predicted trade amount (total) of the selected game content 2*d*, 2*e*, 2*g*, and 2*i* may be "2350 G". Herein, G may be a unit of in-game currency. Furthermore, when the user performs a leftward slide operation with the finger or the like, the selected game content 2*d*, 2*e*, 2*g*, and 2*i* may be collectively traded.

Figure 6A:
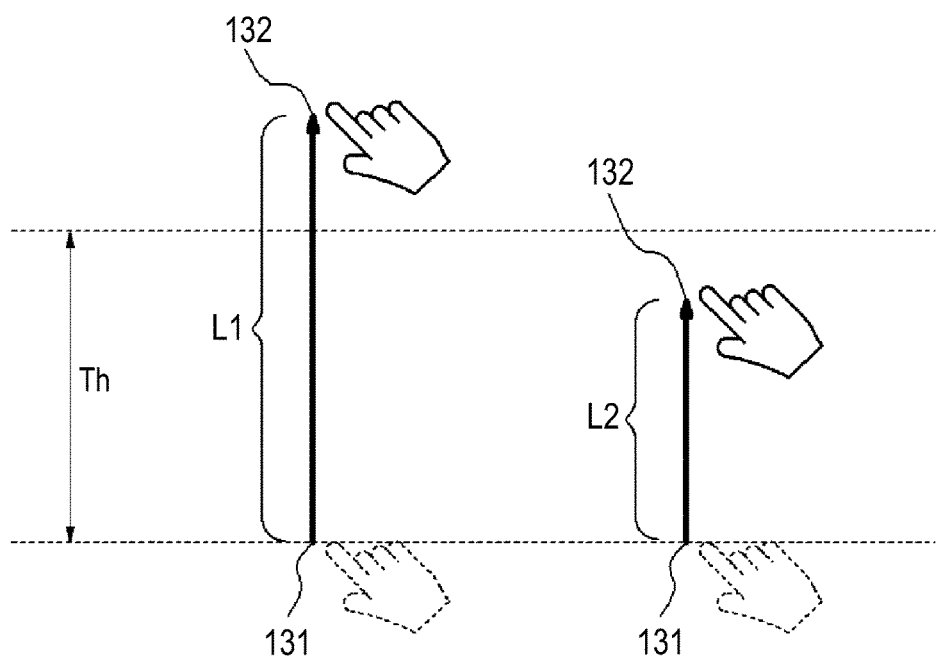
FIG. 6A is a diagram illustrating an execution of a process.

FIG. 6A may be a diagram exemplifying an execution of a process. In the embodiment, as illustrated in FIG. 6A, the process may be executed or canceled in accordance with the length of the slide operation. In the case of executing one process on the selected game content 2*d*, 2*e*, 2*g*, and 2*i*, the user may perform a slide operation in the direction corresponding to one process by using the finger or the like. In the embodiment, a threshold value Th may be provided for the distance from the start point 131 to the end point 132 of the slide operation. For example, the threshold value Th may be set to a distance corresponding to 200 to 400 pixels on the display unit 12. The threshold value Th may be used for determining execution of the process. For example, in a case where a distance L1 from the start point 131 to the end point 132 exceeds the threshold value Th as indicated by an arrow on the left side of FIG. 6A (representing a slide operation), the information processing apparatus 1 may execute the process. In addition, for example, in a case where a distance L2 from the start point 131 to the end point 132 may be equal to or smaller than the threshold value Th as indicated by an arrow on the right side of FIG. 6A (representing a slide operation), the information processing apparatus 1 treats the process as canceled.

Herein, in a case where the prediction 123 may be displayed, in some cases, the user considers that the user may want to stop the process according to the contents. In the example of FIG. 5A, the user grasps that the probability that the result of synthesis being "ABC (rare)" may be high according to the prediction 123. In a case where the user considers "ABC (rare)" to be unnecessary, there may be a possibility that the user may want to cancel the synthesis. In addition, in the example of FIG. 5B, the user grasps that the predicted trade amount may be "2350 G" according to the prediction 123. In a case where the user considers "2350 G" to be little money, there may be a possibility that the user may want to cancel the trade. In the embodiment, the process may be canceled in a case where the prediction 123 may be displayed by the following determination.

Figure 6B:
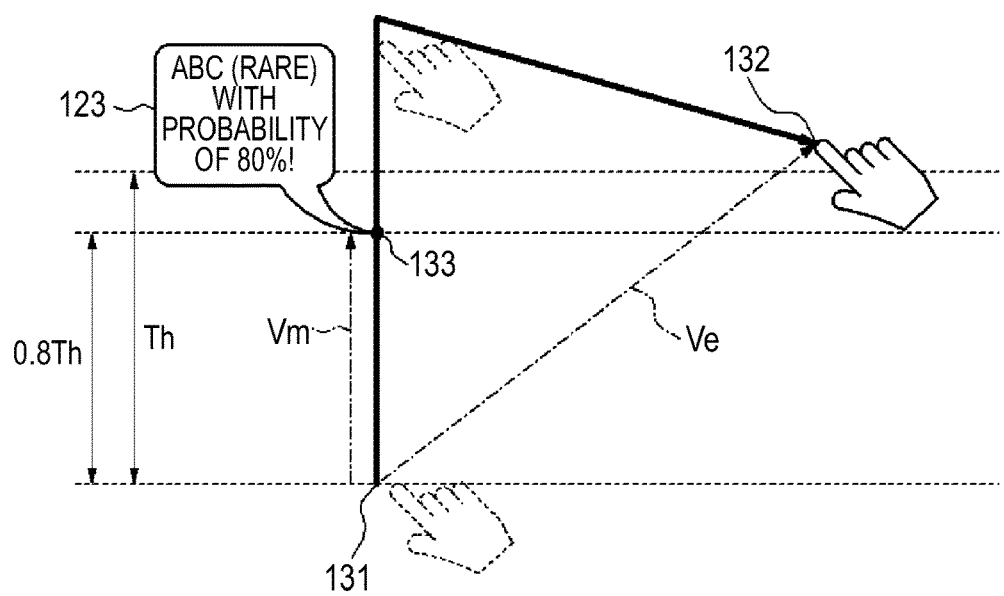
FIG. 6B is a diagram illustrating a process canceling method in a case where prediction is displayed.

FIG. 6B may be a diagram exemplifying a process canceling method in a case where the prediction 123 may be displayed. In the example of FIG. 6B, the user first may perform a slide operation upward from the start point 131 as indicated by a solid arrow. Then, while touching the operation unit 10 with the finger or the like, the user changes the direction to the lower rightward direction on the way and may perform the slide operation to the end point 132. In the upward slide operation from the initial start point 131, when the finger may be separated from the start point 131 by a specific distance smaller than the threshold value Th, the prediction 123 may be displayed. In the embodiment, the specific distance may be 80% (0.8 Th in FIG. 6B) of the threshold value Th. In addition, when the prediction 123 may be displayed, the intermediate point on the route (solid arrow in FIG. 6B) may be set as the specific intermediate point 133. Namely, the specific intermediate point may be an intermediate point that may be separated from the start point by a specific distance (a distance for displaying the prediction 123 of the process associated with one direction) in one direction. Herein, a multiplier (80%) for the threshold value Th giving the specific distance may be an example, and as another example, 50% may be used.

As in the example of FIG. 6B, in a case where the direction from the start point 131 to the end point 132 of the slide operation (the direction of the vector Ve in FIG. 6B) is not the same as the direction from the start point 131 to the specific intermediate point 133 (the direction of the vector Vm in FIG. 6B), the information processing apparatus 1 may cancel the process. Namely, when the final direction from the start point 131 to the end point 132 may be different from the direction from the start point 131 displaying the prediction 123 to the specific intermediate point 133, the information processing apparatus 1 may determine that the user has intentionally changed the direction of the slide operation. Then, the information processing apparatus 1 may cancel the process. In the embodiment, in a case where the directions may be not the same as each other as described above, regardless of the distance (the length of the vector Ve in FIG. 6B) from the start point 131 to the end point 132 of the slide operation, the information processing apparatus 1 may cancel the process.

Herein, the situation where the direction from the start point 131 to the end point 132 of the slide operation may be the same as the direction from the start point 131 to the specific intermediate point 133 may not be limited to exact coincidence. Namely, when the direction from the start point 131 to the end point 132 and the direction from the start point 131 to the specific intermediate point 133 may be substantially the same as each other, it may be determined that the information processing apparatus 1 may be the same. Whether or not the directions may be substantially the same as each other may be determined as follows. In the embodiment, when the angle formed by a vector Ve and a vector Vm in FIG. 6B exceeds a predetermined value (predetermined angle), it may be determined that the directions may be different, and when the angle is equal to or smaller than the predetermined value (predetermined angle), it may be determined that the directions are the same as each other. Herein, the predetermined value (predetermined angle) may be set to, for example, 20° in consideration of the shake of the user's input operation or the like. At this time, in a case where a slide operation that returns the user's finger or the like to an original position on the way (for example, around the start point 131) may be detected, the control unit 13 may cancel the process.

(Flowchart)

Figure 7:
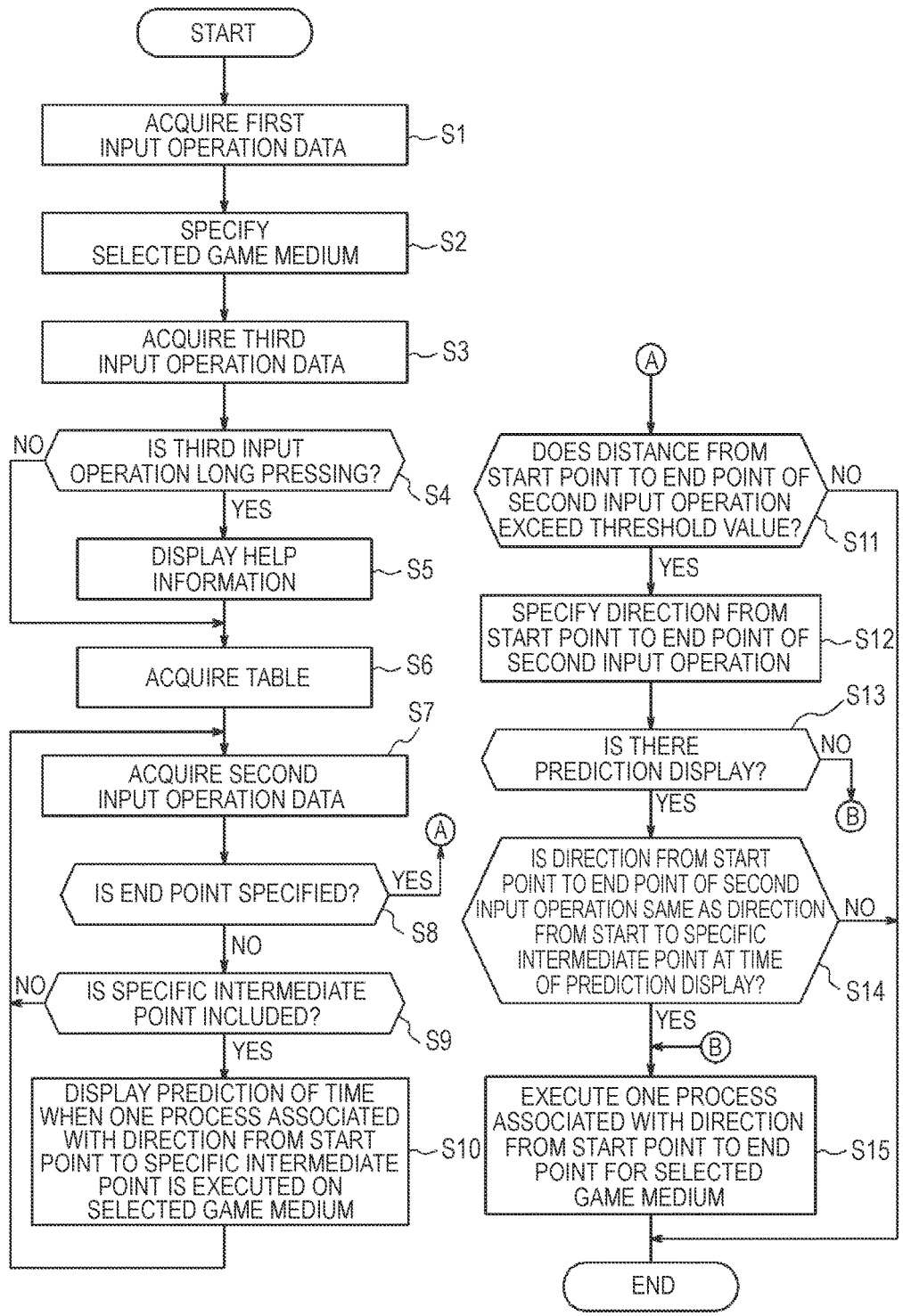
FIG. 7 is a flowchart illustrating a control method for executing a process corresponding to a slide operation by a user on a game content in a game executed by the information processing apparatus.

FIG. 7 may be a flowchart illustrating a game control method executed by the control unit 13. As illustrated in the flowchart of FIG. 7, the control unit 13 may execute processes corresponding to the user's slide operations with respect to the selected game content.

First, the user's input operations received by the operation unit 10 may be classified into three input operations. The first input operation may be an input operation for the user to select a game content. The second input operation may be an input operation instructing a process on the game content selected by the first input operation. Then, the third input operation may be a user's input operation (for example, long-push) different from both the first input operation and the second input operation. The operation unit 10 may receive the first input operation, the second input operation, and the third input operation, and may associate the first input operation, the second input operation, and the third input operation with the coordinate information, and outputs as first input operation data, second input operation data, and third input operation data. The first to third input operation data may also include information on the elapsed time from the start of the input operation.

The control unit 13 may retrieve the first input operation data from the operation unit 10 (step S1). Then, the control unit 13 specifies the selected game content on the basis of the first input operation data (step S2). Step S2 may be a game content specification step. The control unit 13 may retrieve coordinate information such as a tap position, a route of a slide operation, or the like from the first input operation data. The control unit 13 specifies the selected game content by comparing the retrieved coordinate information with the coordinates of the game content displayed on the display unit 12.

The control unit 13 may retrieve the third input operation data from the operation unit 10 (step S3). Then, the control unit 13 may determine whether or not the third input operation is long-push (step S4). The control unit 13 may retrieve, from the third input operation data, for example, coordinate information on the start point and the end point of the input operation, information on the time from the start to the end, and the like. Then, the control unit 13 may determine whether or not the time from the start to the end of the input operation exceeds a predetermined time (a first long-push threshold value). In addition, the control unit 13 may determine whether or not the distance between the coordinates of the start point of the input operation and the coordinates of the end point of the input operation is equal to or smaller than a predetermined distance (a second long-push threshold value). In a case where the time from the start to the end of the input operation exceeds the first long-push threshold value and the distance between the coordinates of the start point and the coordinates of the end point is equal to or smaller than the second long-push threshold value, it may be determined that the input operation is long-push. The first long-push threshold value may be set in a range of, for example, 1 to 3 seconds. In addition, the second long-push threshold value may be set to a distance corresponding to, for example, 1 to 10 pixels on the display unit 12. In a case where it is determined that the third input operation is long-push (Yes in step S4), the control unit 13 may allow the display unit 12 to display the help information 122 (step S5). Step S5 may be a help display step. In the embodiment, the help information 122 displayed on the display unit 12 may not be displayed when a predetermined time (for example, 2 seconds) elapses after the user stops the long-push. After executing the process of step S5 and in a case where it may be determined that the third input operation is not long-push (No in step S4), the control unit 13 proceeds to the process of step S6.

The control unit 13 may retrieve the table 111 from the storage unit 11 (step S6). As described above, the table 111 may be information in which the process on the game content may be associated with the direction of the slide operation.

The control unit 13 may retrieve the second input operation data from the operation unit 10 (step S7). Then, the control unit 13 may retrieve coordinate information such as the start point of the slide operation and the route of the slide operation from the second input operation data. The control unit 13 may determine whether the end point of the slide operation is specified (step S8). In a case where the second input operation data may include the coordinate information of the end point of the slide operation, the control unit 13 may determine that the end point of the slide operation is specified (the end point exists) (Yes in step S8), and the process proceeds to step S11.

In a case where it is determined that the end point of the slide operation is not specified (the end point does not exist) (No in step S8), the control unit 13 may execute the following processes relating to the display of the prediction 123. The control unit 13 may determine whether or not a specific intermediate point is included in the route during the slide operation (step S9). The specific intermediate point may be an intermediate point that may be separated from the start point of the slide operation by a specific distance (distance corresponding to 80% of the threshold value Th in the example of FIG. 6B) toward one direction. In a case where it is determined that a specific intermediate point is included in the route of the slide operation (Yes in step S9), the control unit 13 may allow the display unit 12 to display the prediction 123 of the time when one process associated with the direction from the start point to the specific intermediate point in the table 111 may be executed on the selected game content (step S10). Step S10 may be a prediction display step. In the embodiment, the prediction 123 displayed on the display unit 12 may not be displayed when a predetermined time (for example, 5 seconds) elapses from the start of display. After executing the process of step S10 and in a case where it is determined that a specific intermediate point is not included (No in step S9), the control unit 13 returns to the process of step S7. Then, the control unit 13 may retrieve the updated second input operation data.

In a case where the second input operation data includes the coordinate information of the end point, the control unit 13 may retrieve the distance from the start point to the end point. Then, the control unit 13 may determine whether the distance from the start point to the end point of the second input operation exceeds a threshold value Th (refer to FIG. 6B) (step S11). In a case where it is determined that the distance from the start point to the end point is equal to or smaller than the threshold value Th (No in step S11), the control unit 13 may cancel the process on the selected game content and ends the series of processing. In a case where it is determined that the distance from the start point to the end point exceeds the threshold value Th (Yes in step S11), the control unit 13 may specify the direction from the start point to the end point of the second input operation (slide operation) (step S12).

The control unit 13 may determine whether or not the prediction 123 has been displayed (step S13). In a case where the prediction 123 is not displayed on the display unit 12 (No in step S13), the control unit 13 may proceed to the process of step S15. In a case where the control unit 13 has allowed the display unit 12 to display the prediction 123 (Yes in step S13), the control unit 13 may proceed to the process of step S14 for determining the cancellation of the process.

The control unit 13 may determine whether or not the direction from the start point to the end point of the second input operation (slide operation) is the same as the direction from the start point to the specific intermediate point at the time of prediction 123 display, that is, in the prediction display step (Step S14). If the angle between a vector Ve connecting the start point and the end point and a vector Vm connecting the start point and the specific intermediate point is equal to or smaller than a predetermined value in the process of step S14, the control unit 13 may determine that the directions are the same as each other. In a case where the direction from the start point to the end point of the second input operation is not the same as the direction from the start point to the specific intermediate point (No in step S14), the control unit 13 may cancel the process on the selected game content and may end a series of processes. In a case where the direction from the start point to the end point of the second input operation is the same as the direction from the start point to the specific intermediate point (Yes in step S14), the control unit 13 may proceed to the process of step S15.

The control unit 13 may execute one process associated with the direction from the start point to the end point of the second input operation in the table 111 on the selected game content (step S15) and ends a series of processes. Step S15 may be an execution step.

As described above, the information processing apparatus 1 according to the embodiment may associate the processes on the game content with the directions and may execute one process according to the direction of the user's slide operation on the selected game content. The information processing apparatus 1 according to the embodiment realizes a user interface capable of easily and efficiently executing various processes on the game content.

In addition, in the information processing apparatus 1 according to the embodiment, there may be no need to provide process regions (refer to FIG. 12) corresponding to drag-and-drop application icons on the display unit 12. For this reason, the information processing apparatus 1 may be appropriate for such a smartphone which has the display unit 12 having a size smaller than that of a PC.

Although the invention has been described with reference to the drawings and the embodiments, it should be noted that the skilled in the art can easily make various modifications and changes on the basis of the disclosure. Therefore, it should be noted that the modifications and changes may be included within the scope of the invention. For example, functions and the like included in each means, each step, or the like can be rearranged so as not to be logically contradictory, and a plurality of means, steps, or the like can be combined into one or divided.

(Modified Examples and the Like)

In the above-described embodiment, the control unit 13 may receive the input operation data from the operation unit 10. However, the storage unit 11 may temporarily store the input operation data. Then, the control unit 13 may receive the input operation data from the storage unit 11. At this time, since the storage unit 11 functions as a buffer, the control unit 13 can more flexibly select the timing of retrieving the input operation data.

Figure 8A:
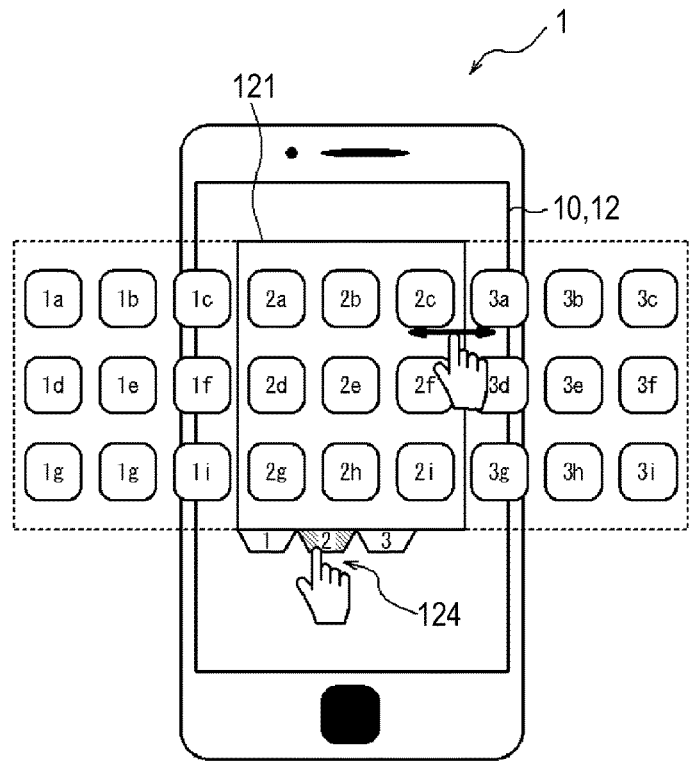
FIG. 8A is a diagram illustrating an example of page switching.
Figure 8B:
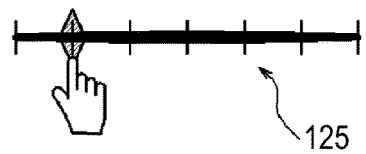
FIG. 8B is a diagram illustrating an example of a slider.

In the above-described example of the embodiment, the number of game content 2a to 2i that can be displayed may be displayed in a list on the display area 121. Herein, in a case where the user owns a game content which cannot be displayed on the display area 121, the user may switch pages by using the display area 121 as a unit. For example, as illustrated in FIG. 8A, the game content 1a to 1i may be included in the first page, the game content 2a to 2i may be included in the second page, and the game content 3a to 3i may be included in the third page.

Herein, in the page switching by using the display area 121 as a unit, in response to an input slide operation in the leftward or rightward direction, the control unit 13 may switch a page to an adjacent page and display the page. For example, as illustrated in FIG. 8A, in a case where the game content 2a to 2i are displayed on the display area 121, in response to an input operation in which the user slides the finger leftward on the display area 121, the game content 3a to 3i may be displayed on the display area 121. Similarly, as illustrated in FIG. 8A, in a case where the game content 2a to 2i are displayed on the display area 121, in response to an input operation in which the user slides the finger rightward on the display area 121, the game content 1a to 1i may be displayed on the display area 121.

In addition, in a case where page switching may be executed in response to the input slide operation in this manner, for example, in response to the input slide operation in the upward or downward direction, the control unit 13 may switch to a predetermined non-adjacent page and display the page. For example, as illustrated in FIG. 8A, in a case where the game content 2*a* to 2*i* are displayed on the display area 121, in response to an input operation in which the user slides the finger upward on the display area 121, the game content 12*a* to 12*i* corresponding to the ten previous pages may be displayed on the display area 121. Similarly, in a case where the game content 12*a* to 12*i* may be displayed on the display area 121, in response to an input operation in which the user slides the finger downward on the display area 121, the game content 2*a* to 2*i* corresponding to the ten previous pages may be displayed on the display area 121.

Furthermore, in a case where page switching is executed in response to the input slide operation, for example, in response to the input slide operation in an oblique direction, the control unit 13 may switch to a predetermined non-adjacent page and display the page. For example, as illustrated in FIG. 8A, in a case where the game content 2*a* to 2*i* are displayed on the display area 121, in response to an input operation in which the user slides the finger from the lower left to the upper right the display area 121, the game content 102*a* to 102*i* corresponding to the 100 previous pages may be displayed on the display area 121.

Herein, the page displayed on the display area 121 may be switched by the tab 124. In the example of FIG. 8A, the user has selected the tab 124 in which the number "2" is written. Then, the game content 2*a* to 2*i* included in the second page may be displayed on the display area 121. The user can easily switch pages by the tab 124. Herein, for example, in a case where the user selects the tab 124 in which the number "1" is written, the game content 1*a* to 1*i* may be displayed on the display area 121. In addition, instead of the tab 124, the page may be switched by the slider 125 illustrated in FIG. 8B. The slider 125 can move the knob in increments of scales corresponding to each page.

Figure 8C:
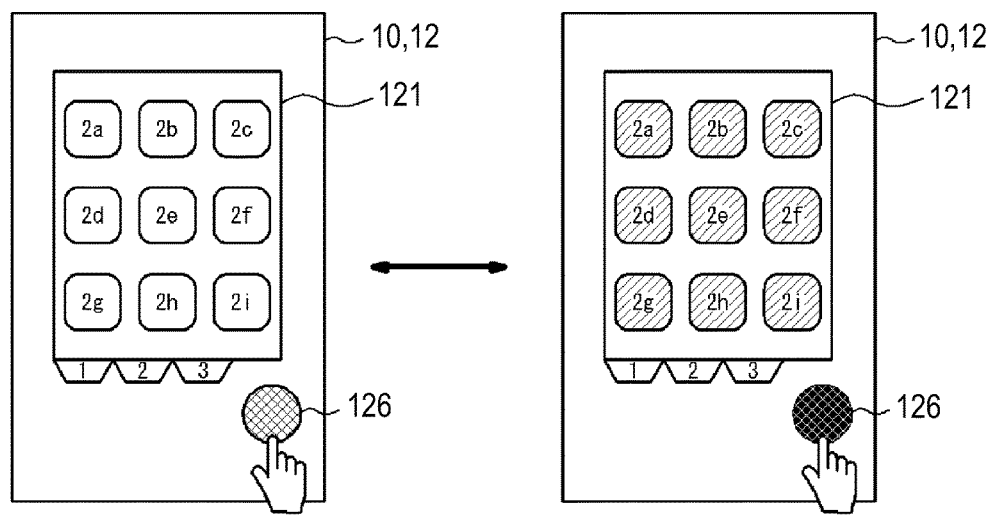
FIG. 8C is a diagram illustrating an example of a full-select button.

Furthermore, as illustrated in FIG. 8C, a full-select button 126 capable of selecting the game content 2*a* to 2*i* displayed on the display area 121 at one time may be provided. For example, in a case where it is determined that the user pushed the full-select button 126 on the basis of the first input operation data, the control unit 13 may determine that all the game content 2*a* to 2*i* displayed on the display area 121 of the display unit 12 have been selected. At this time, the game content 1*a* to 1*i* of the first page and the game content 3*a* to 3*i* of the third page which are not selected by the tab 124 may not be displayed on the display unit 12. For this reason, the control unit 13 treats the game content 1*a* to 1*i* and the game content 3*a* to 3*i* as not being selected. Then, the control unit 13 may control the display unit 12 so as to change the display colors of the selected game content 2*a* to 2*i*. After that, in a case where it is determined that the user has pushed the full-select button 126 again, the control unit 13 may cancel the selection of the game content 2*a* to 2*i*. Namely, the full-select button 126 may function as a toggle button for selecting all of the game content displayed on the display unit 12 or canceling the selection.

Herein, the game content may be sorted under one or more conditions, preferably a plurality of conditions which may be designated by the user. The object of sorting may be limited to the game content (for example, the game content 2*a* to 2*i*) displayed on the display area 121, or the object of sorting may be all the game content including the game content not displayed on the display area 121 (for example, the game content 1*a* to 1*i*, 2*a* to 2*i*, and 3*a* to 3*i*). The plurality of conditions denotes, for example, that a degree of rareness can be designated as the first condition and attribute can be designated as the second condition. Then, the game content may be sorted in descending order of the degree of rareness with respect to each attribute. By such sorting under the plurality of conditions, the user can easily allocate the appropriate game content to each page.

In the above-described embodiment, the table 111 may associate various processes on the game content with the directions of the slide operation for each type of game content displayed on the display area 121 (refer to FIG. 4). Herein, the table 111 may have divisions as to whether the number of game content to be selected or more may be one or plural. Furthermore, even though the types of the game content may be the same, the processes may be different depending on whether the number of game content may be one or plural.

Figure 9A:
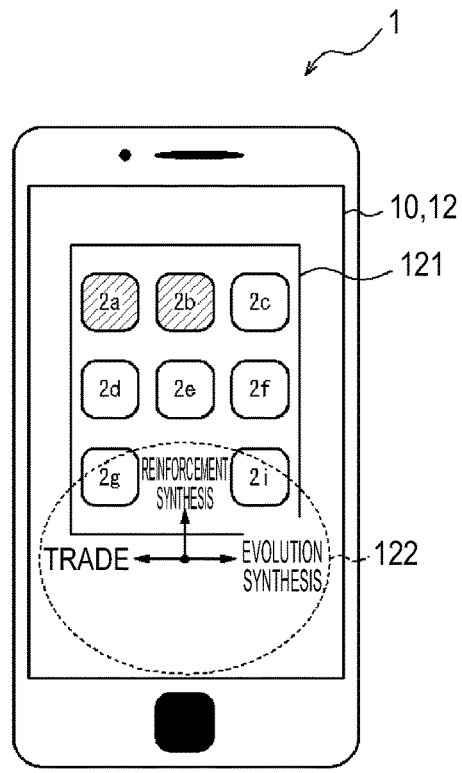
FIG. 9A is a diagram illustrating processes for a plurality of game content.
Figure 9B:
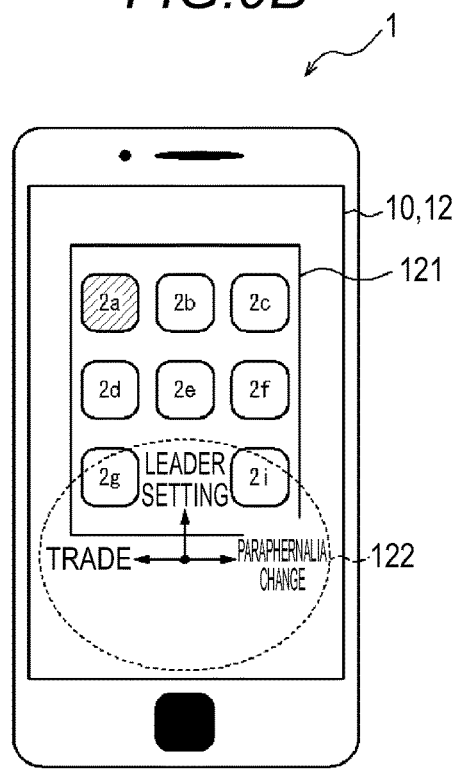
FIG. 9B is a diagram illustrating processes for one game content.

In the examples of FIGS. 9A and 9B, the game content 2*a* to 2*i* as characters may be displayed on the display area 121. In the example of FIG. 9A, a plurality (two) of game content 2*a* and 2*b* may be selected. At this time, the help information 122 indicates that the processes of reinforcement synthesis, evolution synthesis and trade may be possible for the selected character. On the other hand, in the example of FIG. 9B, a single (one) game content 2*a* may be selected. At this time, it may be indicated in the help information 122 that processes of leader setting, equipment change, and trade may be possible for the selected character. In the example of FIG. 9B, instead of the reinforcement synthesis and the evolution synthesis requiring a plurality of game content, it may be possible to execute leader setting and equipment change processes for one game content. In this manner, depending on whether the number of selected game content may be one or plural, the process on the game content may be configured to be different, so that only an executable process may be associated with the direction of the slide operation. Therefore, it possible to realize a user interface that may be easier for the user to use.

In the above-described embodiment, one process may be executed among various processes on the game content according to the direction of the slide operation. Herein, in the situation where it may be decided to execute one process on the game content already, the selection item in one process may be determined according to at least one of the direction and length of the slide operation. For example, after the user selects one process corresponding to the direction of the slide operation, the screen may be transitioned to a dedicated screen for executing one process, and similarly, the user may determine the selection item (for example, parameters, characters, and the like) by a slide operation on the dedicated screen.

Figure 10:
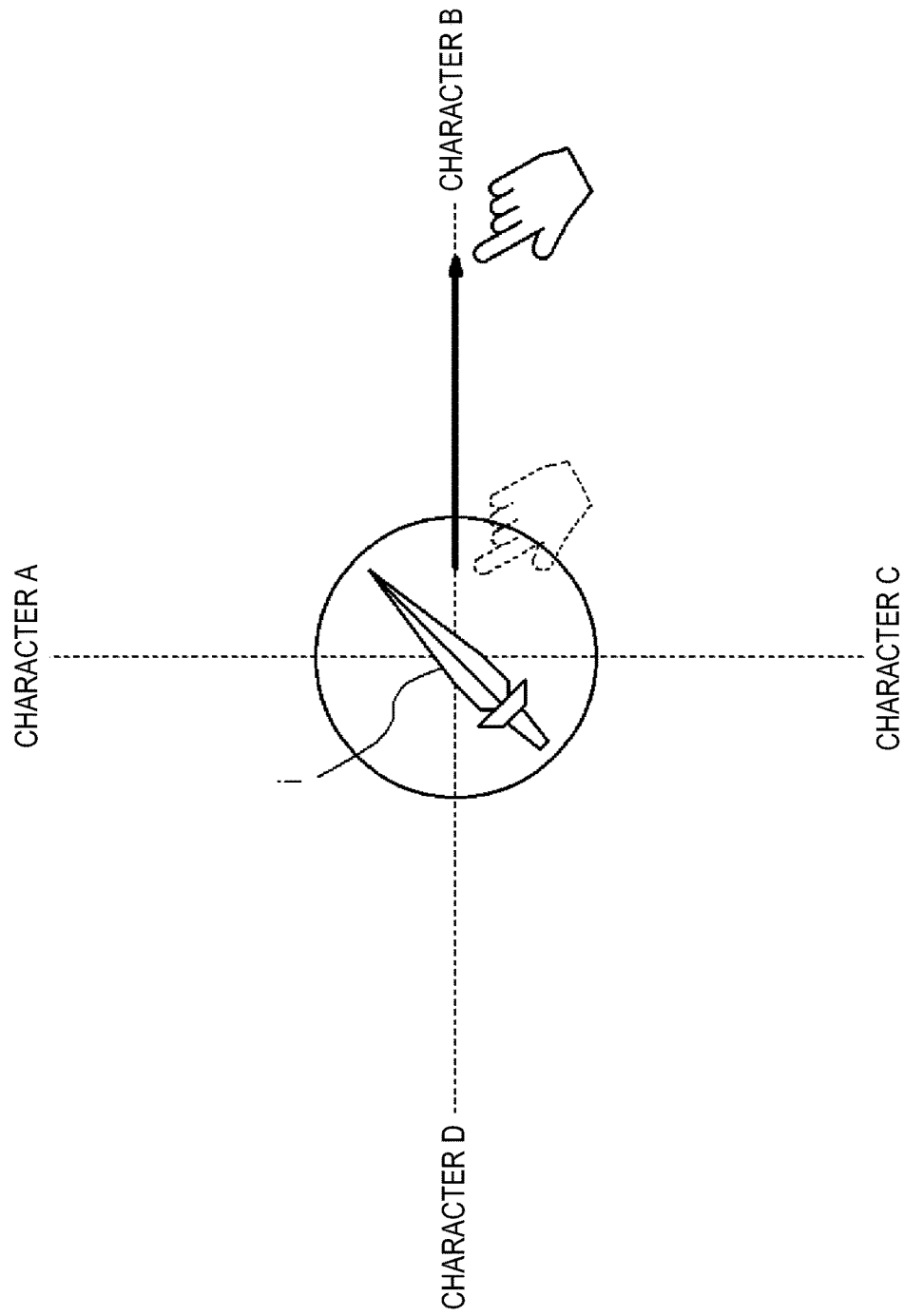
FIG. 10 is a diagram illustrating an example of a screen for selecting a character by a slide operation.

FIG. 10 illustrates a screen for allowing a user to select a character by a slide operation in a situation where a process of equipping the character with an already selected game content is decided. In the center of the screen, the equipment i to be equipped on the character may be displayed. Then, four characters A to D may be allocated to the upward, downward, leftward, and rightward directions of the equipment i. In the example of FIG. 10, the user may perform a rightward slide operation on the screen and instructs to equip the character B with the equipment i. Herein, the prediction 123 may also be displayed on this screen. As the prediction 123, images, parameters, and the like in a case where the character may be equipped with the equipment i corresponding to the direction of the user's slide operation may be displayed. By confirming the prediction 123, the user can try on the equipment with each character before executing the equipping process. In addition, in the example of FIG. 10, although the equipment i may be one weapon, it may be possible to equip the character with a plurality of equipment (for example, a sword and a shield).

Figure 11:
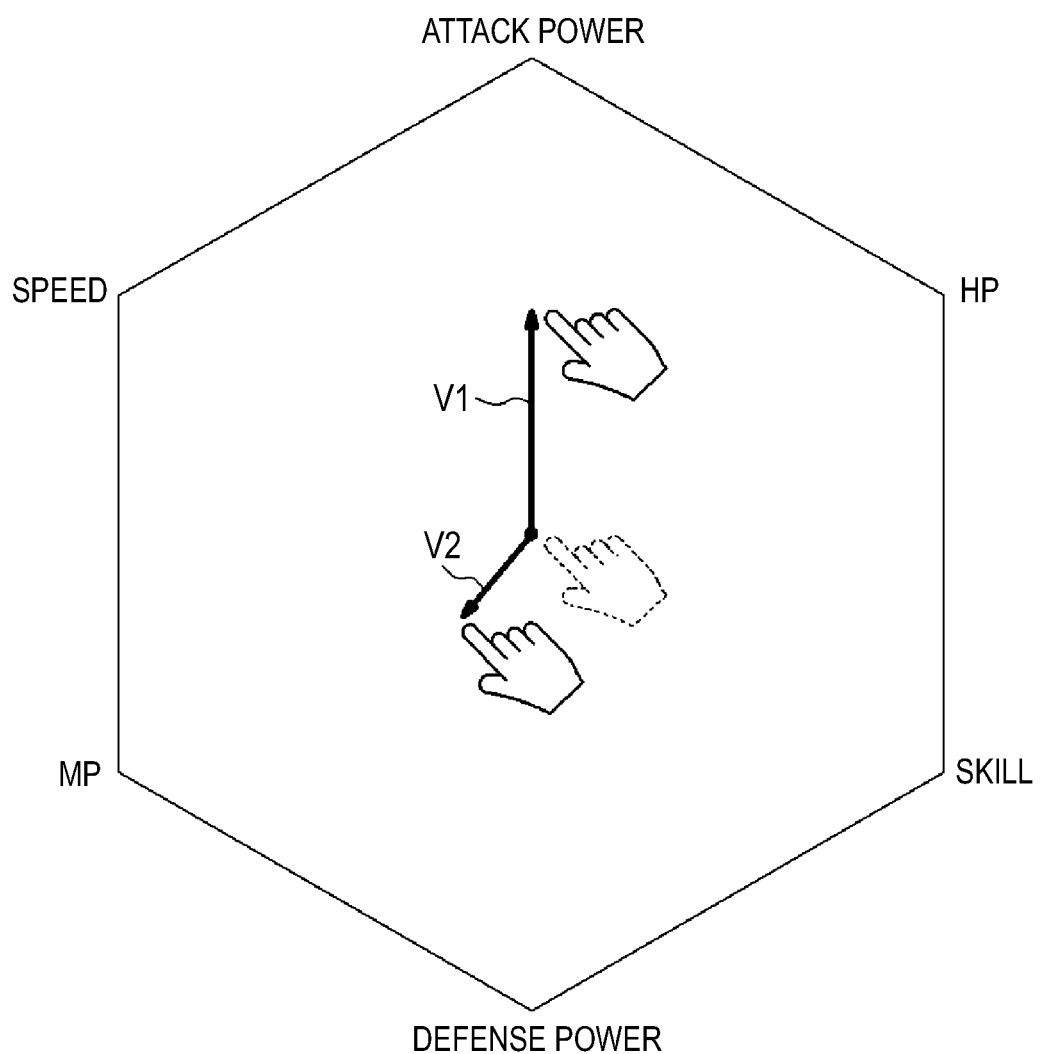
FIG. 11 is a diagram illustrating an example of a screen for selecting parameters to be reinforced by a slide operation.

In addition, FIG. 11 illustrates a screen used by the user to select the parameters for reinforcement by the slide operation in the situation where the process of reinforcing the user character by the reinforcing point (the point which the character can be reinforced by consuming) may be decided. Six parameters (attack power, HP, skill, defense power, MP, and speed) may be assigned to the six directions from the center of the screen. In the example of FIG. 11, the user may perform an upward slide operation V1 on the screen, so that the user can reinforce the attack power assigned upward. In addition, in the example of FIG. 11, the user also may perform a slide operation V2 on the screen to the lower leftward direction (intermediate direction between the MP and the defense power), so that the user can simultaneously reinforce the MP and the defense power. The degree of reinforcement increases according to the length of the slide operation, and thus, the consumption of the reinforcing points also increases. In the example of FIG. 11, since the slide operation V1 may be longer than the slide operation V2, the attack power may be greatly reinforced compared with the MP and the defensive force. Herein, in a case where the user long-pushes the center of the screen, all the parameters may be uniformly reinforced with a strength corresponding to the time of long-push.

In the above-described embodiment, one threshold value may be provided, and execution or cancellation of the process may be performed according to whether or not the distance from the start point to the end point of the slide operation exceeds the threshold value (refer to FIG. 6B). Herein, there may be a plurality of threshold values. Different threshold values may be used for determination of when to execute different processes.

For example, it may be assumed that two processes "synthesis" and "trade" may be associated with one direction. Then, it may be assumed that a first threshold value and a second threshold value larger than the first threshold value may be provided. In a case where the distance from the start point to the end point of the user's slide operation is equal to or smaller than the first threshold value, the control unit 13 may determine that both of the two processes may be canceled. In addition, in a case where the distance exceeds the first threshold value and is equal to or smaller than the second threshold value, the control unit 13 may execute "synthesis" on the selected game content. In addition, in a case where the distance exceeds the second threshold value, the control unit 13 may execute "trade" instead of "synthesis" on the selected game content. In this manner, a plurality of the threshold values corresponding to a plurality of the processes may be provided, so that it may be possible to associate a plurality of the processes in one direction. Since more processes can be associated without increasing the number of slide directions, it may be possible to realize a user interface that enables more efficient operation. At this time, a plurality of processes may be associated with the longitudinal directions (for example, the upward and downward directions) of the display unit 12. In other words, one process may be associated with the short-side direction (for example, the leftward and rightward directions) of the display unit 12. By adjusting the number of processes associated with one direction in accordance with the shape of the display unit 12, even in the information processing apparatus 1 including the display unit 12 with a relatively small size, it may be possible to realize a user interface that may be easier to operate.

In the above-described embodiment, the user's slide operation may be executed on the touch panel. However, the slide operation may not be limited to the touch operation but may be executed in the space (in the air). For example, the operation unit 10 may include a sensor for detecting movement of a user's finger or the like. Then, the operation unit 10 may use the route drawn by the user's finger or the like in the space as an input operation. In addition, for example, the operation unit 10 may be an operation device (controller) operated by a user. Furthermore, the route of the operating device that has moved in the space may be an input operation during the period from the time when the user pushes the button of the operation device (controller) to the time when the user releases the button. The point at which the button may be pushed and the point at which the button may be released may correspond to the start point and the end point, respectively. In addition, the direction from the start point to the end point in the space may be determined to be not only the vertical and horizontal directions (the directions on one plane) but also the forward direction and the depth direction.

In the above-described embodiment, when a slide operation satisfying a predetermined condition (for example, a length exceeding the threshold value and no intentional change of direction) may be performed, one process may be immediately executed. Herein, even though the slide operation satisfying the predetermined condition may be performed, the process may be executed in a case where the preparation may be performed for the first time and the user may perform the slide operation once again in the same direction. For example, it may be assumed that the process associated with the direction of the slide operation performed by the user may be a warehouse. At this time, in the first slide operation, storing in the warehouse may not be executed, and a preparation screen may be displayed. The preparation screen may include, for example, a selected game content and a confirmation message of "Would you save it?" In addition, instead of the slide operation in the same direction, a long-push operation, a stop of a slide operation for a predetermined time, or the like may be used for the operation to execute the process performed by the user after the first slide operation.

In the above-described embodiment, a process executed on the game content may be associated with the direction of the slide operation game content. Herein, cancellation may be associated with one direction of the slide operation. For example, regardless of the type of the game content, cancellation may be associated with the lower leftward direction. At this time, for example, in a case where it is noticed that there may be excess or deficiency in the selection of the game content, the user can immediately cancel the process by performing the slide operation in the lower leftward direction. In addition, the display of the help information 122 may be associated with one direction of the slide operation. For example, regardless of the type of the game content, the display of the help information 122 may be associated with the upper leftward direction. At this time, the user can immediately confirm the help information 122 at any time. In addition, as described above, in a case where preparation for a process (for example, preparation of a warehouse, preparation for trade, and the like) may be performed, final execution may be associated with one direction of the slide operation. At this time, it may be possible to collectively execute the processes after preparing the plurality of processes.

In the above-described embodiment, in response to one input operation (slide) by the user, one process may be executed on the selected game content. However, in response to the input operation of the slide at multiple stages by the user, a plurality of different processes corresponding to the directions of the input operations at the respective stages may be executed. For example, after selecting an item (game content), in response to an input operation of sliding the finger rightward by a predetermined distance, an icon of "item synthesis" (or the above-described prediction 123 or the like) may be displayed. After that, in response to an input operation of further sliding the finger rightward by a predetermined distance, the process of "normal item synthesis" may be executed. On the other hand, herein, in response to an input operation of sliding the finger downward by a predetermined distance instead of rightward, the process of "special item synthesis" may be executed. In addition, herein, in response to an input operation of sliding the finger leftward by a predetermined distance instead of rightward or downward, the icon of "item synthesis" may be deleted, so that the execution of the synthesis process may be canceled.

In the above-described embodiment, when the user long-pushes the game content after selecting the game content, the help information 122 may be displayed on the display unit 12. Herein, the operation for displaying the help information 122 on the display unit 12 may not be limited to long-push. For example, when the user draws a specific figure or the like (for example, a circle, a triangle, or the like), the help information 122 may be displayed on the display unit 12. In addition, in a case where the operation unit 10 may be provided with a pressure sensor and may determine the depth (the input level in the depth direction viewed from the user) according to the pressure of the user's input operation, depth information (pressure value) may be included in the input operation data. Then, in a case where the depth of the input operation may be at a first level, the control unit 13 may treat the input operation as a tap or slide operation, and in a case where the depth of the input operation may be at a second level, the help information 122 may be displayed.

In the above-described embodiment, the display area 121 for displaying the game content may be a portion of the display unit 12. Herein, the whole of the display unit 12 may be the display area 121. In addition, in this case, the user can execute various processes on the selected game content by performing the slide operation in the display area 121. In addition, the number of game content that can be displayed on the display area 121 can be maximized.

In the above-described embodiment, if the end point of the slide operation may not be specified, one process may not be executed. However, even though the end point of the slide operation may not be specified, at the time when the length of the route of the slide operation reaches a predetermined length (for example, the length corresponding to the threshold value Th in FIG. 6A), one process may be executed.

In the above-described embodiment, a threshold value which may be a predetermined length may be provided, and execution or cancellation of the process may be performed according to whether or not the distance from the start point to the end point of the slide operation exceeds the threshold value (refer to FIG. 6B). Herein, the speed may be used instead of the distance. At this time, the threshold value may also be set to be a predetermined speed.

In addition, in the above-described embodiment, a configuration may be employed in which a server apparatus communicating with the information processing apparatus 1 may execute a portion or all of the operations and processes executed by the control unit 13 of the information processing apparatus 1. For example, display control or the like of a screen displayed on the display unit 12 of the information processing apparatus 1 may be executed by any one of the information processing apparatus 1 and the server apparatus or may be executed by the information processing apparatus 1 and the server apparatus cooperating with each other.

In addition, in the above-described embodiment, web display may be performed in which a portion of the game screen may be displayed on the display unit 12 of the information processing apparatus 1 on the basis of the data generated by the server apparatus, or native display may be performed in which a portion of the game screen may be displayed by native application installed in the information processing apparatus 1. In this manner, the game according to the above-described embodiment may be a hybrid game in which each of the information processing apparatus 1 and the server apparatus may execute a portion of the process.

In addition, in order to function as the information processing apparatus 1 or the server apparatus, for example, a computer, a mobile phone, or the like may be appropriately used. The information processing apparatus 1 or the server apparatus can be realized by storing a program describing process contents for realizing each of the above-described may function in an accessible storage unit and allowing a CPU to read and execute the program.

What is claimed is:

1. A non-transitory computer-readable storage medium comprising program code that, when executed, causes an information processing apparatus including:
    a display unit configured to display a game content;
    an operation unit configured to receive a first input operation of a user, the first input operation of the user comprising a selection of a game content, the operation unit being further configured to receive a second input operation of the user, the second input operation of the user comprising an instruction to perform a process on the game content selected by the first input operation, the operation unit being further configured to output first input operation data comprising coordinate information associated with the first input operation and second input operation data comprising coordinate information associated with the second input operation; and
    a storage unit configured to store information comprising an association of a process executable on the game content and a particular direction;
    to execute steps of:
    game content specifying, in a game content specifying step, with the information processing apparatus, the selected game content based on the first input operation data;
    retrieving, on the information processing apparatus, the information from the storage unit, the information retrieved from the storage unit comprising the process executable on the game content and the particular direction associated with the process;
    receiving a start point of the second input operation based on the second input operation data, and, when the start point of the second input operation is specified and the end point is not specified, displaying, in a prediction display step, on the display unit, a prediction, wherein the prediction is displayed at the time that a process associated with a direction from the start point to a specific intermediate point of the second input operation is executed;
    determining a direction, from the start point to an end point, of the second input operation, based on the second input operation data; and
    executing, in an execution step, with the information processing apparatus, on the game content, a process associated with the direction of the second input operation game content, based on the information retrieved from the storage unit.

2. The non-transitory computer-readable medium according to claim 1,
wherein the operation unit is configured to receive a third input operation different from the first input operation and the second input operation, and wherein the operation unit is configured to output third input operation data comprising coordinate information associated with the third input operation, and
wherein the non-transitory computer-readable medium causes the information processing apparatus to execute a help display step of displaying help information, the help information comprising at least one of an image and a sentence explaining correspondence between processes on the game content and directions on the display unit, based on the third input operation data.

3. The non-transitory computer-readable medium according to claim 2,
wherein, in the help display step,
when a time from a start to an end of the third input operation exceeds a predetermined time and a distance between a coordinate of a start point and a coordinate of an end point is equal to or smaller than a predetermined distance, displaying the help information on the display unit.

4. The non-transitory computer-readable medium according to claim 1,
wherein, in the execution step,
when a distance from a start point to an end point of the second input operation exceeds a threshold value, the process executable on the game content is executed on the selected game content.

5. The non-transitory computer-readable medium according to claim 1,
wherein, in the execution step,
in a case where a speed from a start point to an end point of the second input operation exceeds a threshold value, the process executable on the game content is executed on the selected game content.

6. The non-transitory computer-readable medium according to claim 4,
wherein, in the execution step,
the distance is compared against a plurality of threshold values, and each of the plurality of threshold values is used to determine whether one of a plurality of different processes should be executed.

7. The non-transitory computer-readable medium according to claim 5,
wherein, in the execution step,
the speed is compared against a plurality of threshold values, and each of the plurality of threshold values is used to determine whether one of a plurality of different processes should be executed.

8. The non-transitory computer-readable medium according to claim 1,
wherein the display unit is configured to display a full-select button, and
wherein, in the game content specifying step,
when it is determined, based on the first input operation data, that the user has pushed the full-select button, selecting all the game content displayed on the display unit.

9. A control method for a game configured to be executed by an information processing apparatus including:
a display unit configured to display a game content;
an operation unit configured to receive a first input operation of a user, the first input operation of the user comprising a selection of a game content, the operation unit being further configured to receive a second input operation of the user, the second input operation of the user comprising an instruction to perform a process on the game content selected by the first input operation, the operation unit being further configured to output first input operation data comprising coordinate information associated with the first input operation and second input operation data comprising coordinate information associated with the second input operation; and
a storage unit configured to store information comprising an association of a process executable on the game content and a particular direction;
wherein the control method comprises:
specifying, with the information processing apparatus, the selected game content based on the first input operation data;
retrieving, on the information processing apparatus, the information from the storage unit, the information retrieved from the storage unit comprising the process executable on the game content and the particular direction associated with the process;
receiving, on the information processing apparatus, a start point of the second input operation based on the second input operation data, and, when the start point of the second input operation is specified and the end point is not specified, displaying, in a prediction display step, on the display unit, a prediction, wherein the prediction is displayed at the time that a process associated with a direction from the start point to a specific intermediate point of the second input operation is executed;
determining a direction, from the start point to an end point, of the second input operation, based on the second input operation data; and
executing, with the information processing apparatus, on the game content, a process associated with the direction of the second input operation game content, based on the information retrieved from the storage unit.

10. An information processing apparatus, comprising:
a display unit configured to display a game content;
an operation unit configured to receive a first input operation of a user, the first input operation of the user comprising a selection of a game content, the operation unit being further configured to receive a second input operation of the user, the second input operation of the user comprising an instruction to perform a process on the game content selected by the first input operation, the operation unit being further configured to output first input operation data comprising coordinate information associated with the first input operation and second input operation data comprising coordinate information associated with the second input operation;
a storage unit configured to store information comprising an association of a process executable on the game content and a particular direction; and
a control unit,
wherein the control unit is configured to perform the steps of:
specifying the selected game content based on the first input operation data;
retrieving the information from the storage unit, the information retrieved from the storage unit comprising the process executable on the game content and the particular direction associated with the process;

receiving a start point of the second input operation based on the second input operation data, and, when the start point of the second input operation is specified and the end point is not specified, displaying, in a prediction display step, on the display unit, a prediction, wherein the prediction is displayed at the time that a process associated with a direction from the start point to a specific intermediate point of the second input operation is executed;

determining a direction, from the start point to an end point, of the second input operation, based on the second input operation data, and executing, on the game content, a process associated with the direction of the second input operation game content, based on the information retrieved from the storage unit.

11. The non-transitory computer-readable medium according to claim 1, wherein, in the execution step, when the direction from the start point to the end point of the second input operation is substantially the same as the direction from the start point to the specific intermediate point of the second input operation in the prediction display step, the program causes the information processing apparatus to execute the process executable on the game content on the selected game content.

* * * * *